May 1, 1934.    G. A. DE VLIEG    1,956,983
GRINDING MACHINE
Filed Dec. 12, 1931    2 Sheets-Sheet 1
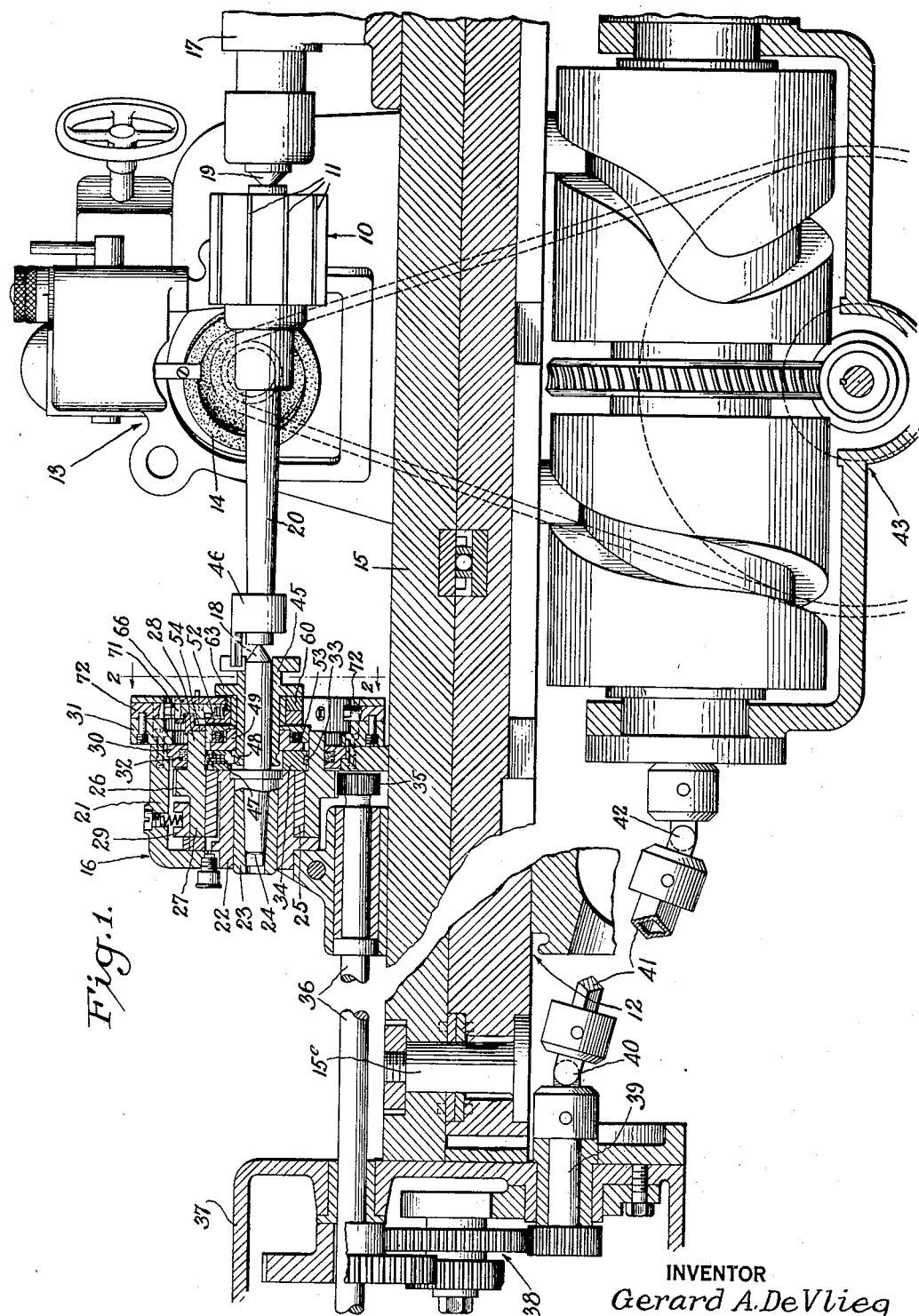
INVENTOR
*Gerard A. DeVlieg*
BY
*Chindahl, Parker & Carlson*
ATTORNEYS

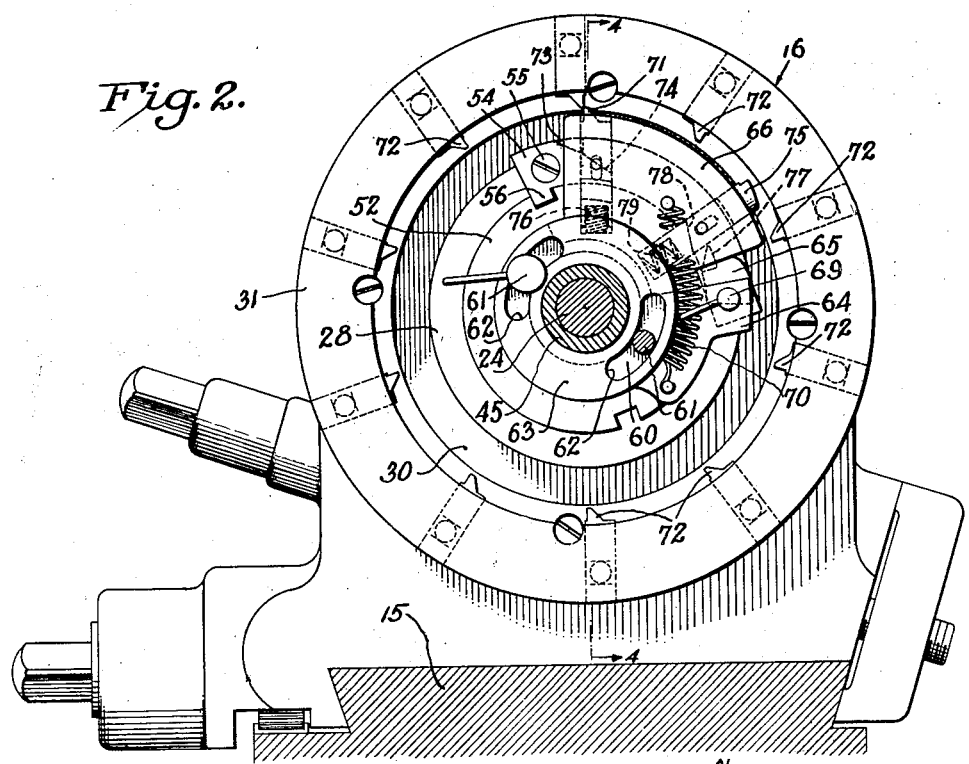
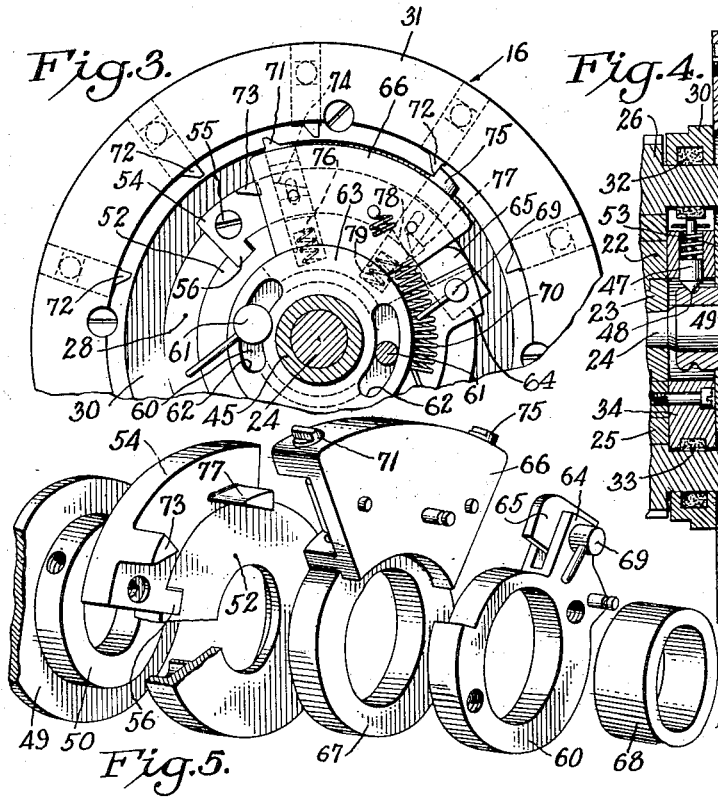
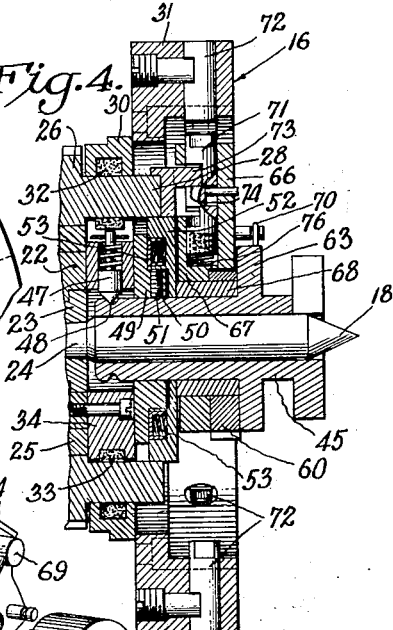

Patented May 1, 1934

1,956,983

UNITED STATES PATENT OFFICE 1,956,983

GRINDING MACHINE

Gerard A. De Vlieg, Rockford, Ill.

Application December 12, 1931, Serial No. 580,543

12 Claims. (Cl. 51—123)

The present invention relates to improvements in grinding machines, and particularly to the type of machine shown in my Patent No. 1,710,533, which is adapted primarily for grinding cutters, such as reamers, having generally longitudinal blades.

In the machine shown in said patent, which is adapted to grind cutters having inclined or spiral blades, the cutter is reciprocated longitudinally across the grinding wheel and is rotated continuously in timed relation to the reciprocation so as to compensate for the inclination of each blade during the grinding stroke and to index different blades successively into the line of grinding.

The primary object of the present invention is to provide a machine of this type having novel means for varying the rotation produced by the cutter-rotating means so that cutters having straight blades may be ground.

Another object is to provide a machine of this character which will grind cutters having straight blades, either evenly or unevenly spaced.

A further object is to provide a novel grinding machine capable of attaining the foregoing objects which is simple and inexpensive in construction, and which is efficient, automatic and expeditious in operation.

Another object is to provide a novel indexing mechanism operable to produce intermittent rotation of the driven element.

Other objects and advantages will become apparent from the following description taken in connection with the accompanying drawings, in which:

Figure 1 is a fragmentary longitudinal sectional view of a machine embodying the features of the invention.

Fig. 2 is a sectional view on an enlarged scale taken along the line 2—2 of Fig. 1.

Fig. 3 is a fragmentary sectional view similar to Fig. 2 but showing the parts in a different position in their sequence of operation.

Fig. 4 is a fragmentary sectional view taken along the line 4—4 of Fig. 2.

Fig. 5 is a perspective view of various of the parts in the drive.

As mentioned above, the preferred embodiment of the invention is incorporated in a grinding machine of the type disclosed in my prior patent, No. 1,710,533, and comprises briefly a grinding element, a work support for a rotary work piece, such as a reamer, having a plurality of peripherally spaced blades, means for effecting relative reciprocation between the work support and the grinding element axially of the work piece, said reciprocation comprising a grinding stroke and a return stroke, a rotary driving element mounted on the work support and continuously rotating in timed relation to the reciprocation, a driving connection between the driving element and the work piece, and means for rendering said connection ineffective and for holding said work piece against rotation with the driving means during the grinding stroke. Said last-mentioned means is so constructed that cutters having either equally spaced or unequally spaced blades may be ground.

In the drawings, a cutter is shown at 10 (see Fig. 1), which comprises a plurality of blades 11. In the cutter illustrated, the blades 11 are shown as straight. These blades may be spaced in any desired manner, the cutter shown in the drawings having equally spaced blades.

The grinding machine comprises generally a base 12 having a vertical standard 13 on the rear. Rotatably mounted on the vertical standard 13 is a grinding wheel 14 which preferably is cup-shaped, and which is inclined slightly from a perpendicular to the front of the machine so as to provide clearance.

Mounted for reciprocation on the front of the base 12 and transversely of the face of the grinding wheel 14 is a carriage 15, on the opposite ends of which are adjustably mounted a headstock 16 and a tailstock 17 respectively having centers 18 and 19. An arbor 20 adapted to support the cutter 10 is mounted between the centers 18 and 19.

Preferably, the headstock 16 is formed with a housing 21 slidably adjusted on the carriage 15. Fixed to the left wall of the housing 21 is a sleeve 22 in which is fixed a second sleeve 23 having a tapered bore which receives the tapered shank 24 of the work center 18. Surrounding the sleeve 22 is a bearing sleeve 25 on which a driving element or gear 26 is rotatably mounted. The gear 26 has a hub 27 on its left end and an annular flange 28 on its right end, concentric with the center 18 and projecting out from the right end of the housing 21. To prevent back lash, a brake shoe 29 is spring pressed inwardly against the hub 27 of the gear 26. The right-hand end of the housing 21 is closed by a member 30 engaging the outer periphery of the flange 28 and secured against a shoulder cut in the end of the housing 21 by a ring 31 bolted to the housing. The member 30 carries an oil seal 32 to seal the outer periphery of the flange 28, while the inner periphery thereof is sealed by an oil seal 33 carried by a ring 34 secured to the sleeve 22.

The gear 26 meshes with a pinion 35 on a horizontal shaft 36 which is adjustable with the headstock 16, and which extends slidably through a gear housing 37 mounted on the left end of the carriage 15. The shaft 36 is connected through a train of change-speed gears 38 in the housing to a stub shaft 39. The latter is connected through a universal joint 40 to an extensible shaft 41 which is connected through a universal joint 42 to a drive mechanism 43 (more fully described in said patent) for reciprocating the carriage 15. As a result, the gear 26 is driven in timed relation to the reciprocation of the carriage 15.

The drive mechanism may be adapted to reciprocate the carriage 15 with a grinding stroke and a quick return stroke. The carriage 15 is pivoted on a pin 15ᵃ so that it may be moved through a sufficient angle to separate the cutter 10 and the grinding wheel 14 during the return stroke when grinding cutters in which the wheel would interfere with the blades, as is described in said patent.

As mentioned above, a driving connection is provided for operatively connecting the driving element to the work piece, that is, the annular flange 28 of the gear 26 to the arbor 20 supporting the cutter 10. This connection preferably comprises a drive sleeve 45 which is rotatably mounted on or about the center 18, and which has an interlocking connection with a dog 46 on the arbor 20. To secure the drive sleeve 45 yieldingly against axial movement relative to the work center 18, a spring-pressed locking pin 47 is mounted in a radial socket in the ring 34, which is fixed, and has a conical inner end bearing in an annular V-shaped groove 48 cut in the drive sleeve 45.

The driving connection preferably includes a pair of frictionally engaged members respectively secured for rotation with the annular flange 28 of the gear 26 and the drive sleeve 45. The member secured to the drive sleeve 45, in the present instance, comprises a flange 49 having a hub 50 secured to the sleeve 45 as by a set screw 51. The member secured for rotation with the annular flange 28 comprises a flange 52 positioned in face-to-face relation with the flange 49 and having a plurality of spring-pressed friction buttons 53 mounted in cavities in the face of the flange 52 and bearing against the adjacent face of the flange 49. The flange 52 is adapted to be rotated by a member 54 secured to the end face of the flange 28 of the gear 26, as by a screw 55, and having a tongue 56 fitting in a keyway cut in the periphery of the flange 52. Thus, the drive sleeve 45 is rotated by the gear 26 through the friction connection.

The present embodiment of the invention also includes means for rendering the friction connection ineffective and for holding the work piece against rotation with the gear 26. To this end, a ring 60 is mounted on the drive sleeve 45 and is adjustably secured for rotation therewith by screws 61 threaded into the ring 60 and extending through arcuate slots 62 cut in a flange 63 formed integrally on the drive sleeve 45. Extending radially from the ring 60 is a lug 64 on which is mounted an adjusting block 65 adapted to bear against an arm 66 having a hub 67 rotatably mounted on a bearing sleeve 68 surrounding the drive sleeve 45. When the drive sleeve 45 is rotated through the friction connection with the gear 26, the ring 60 rotates therewith and the adjusting block 65 carries the arm 66 around with it. The adjusting block 65 is secured to the lug 64 by a screw 69, and may be turned to present a different edge toward the arm 66 whereby the position of the arm 66 relative to the driving sleeve 45 may be adjusted. A spring 70 is provided to hold the block 65 in contact with the arm 66.

Carried by the arm 66 is a movable detent 71 which is adapted to coact with a plurality of stop members 72 to hold the drive sleeve 45 against rotation with the gear 26 and thus render the friction connection ineffective. The stop members 72 are, in the present instance, fixed by being secured as by screws in the ring 31 bolted to the housing 21. The stop members 72 extend into the path of the detent 71 and are peripherally spaced in accordance with the spacings of the blades 11 of the cutter. In the present instance, the stop members 72 are equally spaced so as to provide for equally spaced blades. The detent 71, as the arm 66 is rotated, strikes a stop member 72 and thus holds the drive sleeve 45 against rotation. This stoppage occurs at the start of the grinding stroke of the carriage 15.

When the grinding stroke is completed, it is desired to rotate the cutter to bring the next blade into grinding position. To this end, the detent 71 is moved out of contact with the stop member 72 to permit the friction connection to be again effective to rotate the drive sleeve. Means is provided for so moving the detent 71, which means, in the present instance, is carried by the member 54 secured to the gear 26. As shown in the drawings, this means comprises a cam lug 73 extending laterally from the member 54 and adapted to move against a cam surface 74 cut in the side of the detent 71, and move the detent 71 inwardly out of contact with stop member 72.

When the cam lug 73 frees the detent 71 from the stop member 72, the arm 66, and consequently the detent 71, rotate with the gear 26, as does the cam lug 73, so that the lug 73 tends to remain in contact with the detent 71 and hold it in a position where it cannot engage the next stop member 72.

To restore the detent 71 to an engaging position, means is provided for temporarily holding the arm 66 against rotation so that the cam lug 73 will move out of contact with detent 71. This means, as illustrated, comprises a second or temporary detent 75 movably mounted in the arm 66, said detent 75 being positioned to engage one of the stop members 72 shortly after the first or grinding detent 71 has been disengaged from a stop member. When the temporary detent 75 so engages a stop member, the arm 66 is held against rotation with the gear 26 and the cam lug 73 moves on out of contact with the grinding detent 71, the latter being moved outwardly by a spring 76 to a position where it may engage the next stop member 72.

To move the temporary detent 75 out of engagement with the stop member to permit the drum 66 to rotate until the grinding detent 71 engages the next stop member, a second cam lug 77 is formed on the member 54 rotating with the gear 26. The second cam lug 77 is adapted to coact with a cam surface 78 formed on the temporary detent 75 to draw the latter inwardly out of engagement with the stop member and thus permit the arm 66 to rotate until the grinding detent 71 engages the next stop member 72. When the grinding detent 71 engages the next stop member 72, the cam lug 77 moves out of contact with the temporary detent 75, and a spring 79 moves the temporary detent 75 back into position to engage the next stop member 72. Thus, each detent serves to effect the restoration of the other to an engaging position.

In the operation of the machine, when the carriage 15 starts on a grinding stroke, the grinding detent 71 is in engagement with a stop member 72, thus causing the friction connection between the flanges 49 and 52 to slip and hold the drive sleeve 45 against rotation. While the cutter is thus held against rotation, the gear 26 carrying the cam lug 73 continues to rotate. When the cam lug 73 comes around into contact with the cam surface 74 on the grinding detent 71, the latter is moved out of engagement with the stop member, and the arm 66, as well as the drive sleeve 45, rotate with the gear 26. This rotation occurs during the return stroke of the carriage 15 and indexes the cutter.

Shortly after the rotation of the arm 66 and the cutter starts, the temporary detent 75 engages a stop member 72 to hold the arm 66 against rotation. This permits the cam lug 73 to move out of engagement with the grinding detent 71 and the spring 76 to move the grinding detent into a position where it will engage the next stop member 72.

The gear 26, meanwhile, continues its rotation and carries the cam lug 77 into engagement with the cam surface 78 on the temporary detent 75 withdrawing the latter from engagement with the stop member 72 and permitting the arm 66 to rotate with the gear 26. Such rotation continues until the grinding detent 71 engages the next stop member 72 to halt the rotation of the cutter, at which time the grinding stroke of the carriage 15 starts. With rotation of the arm 66 stopped by the engagement of the grinding detent 71 with the stop member 72, the gear 26 continues its rotation and the cam lug 77, carried thereby, moves out of engagement with the temporary detent 75 permitting the latter to move out ready for its next engagement with a stop member.

From the above description, it will be apparent that I have provided a novel grinding machine adapted to grind cutters having straight blades either evenly or unevenly spaced. It will also be apparent that I have provided a novel indexing mechanism operable to produce intermittent rotation of the driven element.

I claim as my invention:

1. A grinding machine comprising, in combination, a grinding element, a slidable carriage, means for supporting a rotary work piece on said carriage, means for effecting a relative reciprocation between said grinding element and said carriage, each reciprocation comprising a grinding stroke and a return stroke, a rotary driving element mounted on said carriage and timed to rotate through one complete revolution for each reciprocation of said carriage, a rotary driven element coaxial with said driving element and operatively connected to said first mentioned means, said elements having a frictional end face driving engagement, detent means for holding said driven element against rotation, and means carried by and rotatable with said driving element for releasing said detent means to permit rotation of said driven element through a predetermined distance once during each return stroke.

2. A grinding machine comprising, in combination, a grinding element, a slidable carriage, means for supporting a rotary work piece on said carriage, means for effecting a relative reciprocation between said grinding element and said carriage, each reciprocation comprising a grinding stroke and a return stroke, a rotary driving element timed to rotate through one complete revolution for each reciprocation of said carriage, a rotary driven element operatively connected to said first mentioned means, said elements having a frictional driving engagement, detent means for holding said driven element against rotation, and means carried by and rotatable with said driving element for releasing said detent means to permit rotation of said driven element through a predetermined distance during each return stroke.

3. A grinding machine comprising, in combination, a grinding element, a slidable carriage, means for supporting a rotary work piece on said carriage, means for effecting a relative reciprocation between said grinding element and said carriage, each reciprocation comprising a grinding stroke and a return stroke, a rotary driving element mounted on said carriage and rotatable in timed relation to said reciprocation, a rotary driven element coaxial with said driving element and operatively connected to said first mentioned means, said elements having a frictional end face driving engagement, detent means for holding said driven element against rotation, and means rotatable with said driving element for periodically releasing said detent means to permit rotation of said driven element through a predetermined distance.

4. An indexing mechanism comprising, in combination, a casing, a rotary driving element mounted in said casing, means for rotating said element continuously, a rotary driven element mounted in said casing and coaxial with said driving element, said elements having a direct frictional driving engagement, detent means for holding said driven element against rotation by said driving element, and means rotatable with said driving element for periodically releasing said detent means to permit rotation of said driven element through a predetermined distance.

5. An indexing mechanism comprising, in combination, a rotary driving element, a rotary driven element, a friction drive connection between said elements, detent means for holding said driven element against rotation by said driving element, and means operable by said driving element for periodically releasing said detent means to permit rotation of said driven element through a predetermined distance, said detent means being adjustable at will to change the angular phase relation between said driven element and said detent means.

6. An indexing mechanism comprising, in combination, a rotary driving element, means for continuously rotating said element, a rotary driven element, a friction drive connection between said elements, a plurality of fixed stop members mounted in peripherally spaced relation about said driven element, a yieldable detent rotatable with said driven element and normally extending into position for selective engagement with one of said stop members to hold said driven element against rotation, and cam means operable by said driving element for periodically withdrawing said detent from said engagement to permit rotation of said driven element through a predetermined distance determined by the spacing between two adjacent stop members, whereby said driven element is rotated in a step-by-step movement, with the steps corresponding in length to the respective spacing of consecutive stop members.

7. An indexing mechanism comprising, in combination, a rotary driving element, means for continuously rotating said element, a rotary driven element, a friction drive connection between said elements, a plurality of fixed stop members mounted in peripherally spaced relation about said driven element, two peripherally spaced detents mounted on said driven element for rotation therewith and being spaced apart further than any two adjacent stop members, yieldable means normally urging said detents into position for selective engagement with said stop members, and cam means operable by said driven member first to withdraw one of said detents out of engagement with one of said stop members to permit the other of said detents to move into engagement with another of said stop members, and then to withdraw said other detent from said last mentioned stop member to permit said one detent to move into engagement with another of said stop members.

8. An indexing mechanism comprising, in combination, a rotary driving element, means for continuously rotating said element, a rotary driven element, a friction drive connection between said elements, a plurality of fixed stop members mounted in peripherally spaced relation about said driven element, two peripherally spaced detents mounted on said driven element for rotation therewith and being spaced apart further than any two adjacent stop members, yieldable means normally urging said detents into position for selective engagement with said stop members, and cam means operable by said driving element for periodically effecting alternate engagement of said detents selectively with said stop members to cause said driven element to rotate in a predetermined step-by-step movement.

9. An indexing mechanism comprising, in combination, a rotary driving element, a driven element, a friction connection between said elements, a detent carried by said driven element, a plurality of stop members spaced around said driven element and adapted to be successively engaged by said detent, and means carried by said driving element for successively disengaging said detent from said stop members.

10. An indexing mechanism comprising, in combination, a rotary driving element, a driven element, a friction connection between said elements, a movable detent mounted on said driven element, a plurality of spaced stop members positioned around said driven element and adapted to be successively engaged by said detent to hold said driven element against rotation with said driving element, means carried by said driving element for successively moving said detent out of engagement with said stop members to permit said friction connection to rotate said members together, and means for moving said first mentioned means out of contact with said detent whereby said detent may engage the next stop member.

11. An indexing mechanism comprising, in combination, a rotary driving element, a driven element, a friction connection between said elements, a plurality of peripherally spaced fixed stop members, a detent movably mounted on said driven element and adapted to engage said stop members successively to hold said driven element against rotation with said driving element, cam means carried by said driving element and adapted to move said detent out of engagement with each stop member to permit said driven element to rotate with said driving element, a second detent carried by said driven element adapted to engage a stop member after said first detent has been moved to a disengaging position whereby said driven element is held against rotation with said driving element while said cam means passes beyond said first detent, and a second cam means carried by said driving element and adapted to disengage said second detent from said stop member.

12. An indexing mechanism comprising, in combination, a rotary driving element, a driven element, a friction connection between said elements, disengageable means effective to predetermined points in the rotation of said driven element for holding it against rotation with said driving element, means carried by said driving element and operable in the rotation thereof for disengaging said holding means whereby said driven element rotates with said driving element, and means for temporarily holding said driven element against rotation with said driving element to permit said disengaging means to pass beyond said holding means whereby the latter again becomes effective.

GERARD A. DE VLIEG.